(No Model.)
J. N. EDGERLY.
TRUSS HEDGE FENCE.
No. 347,423. Patented Aug. 17, 1886.
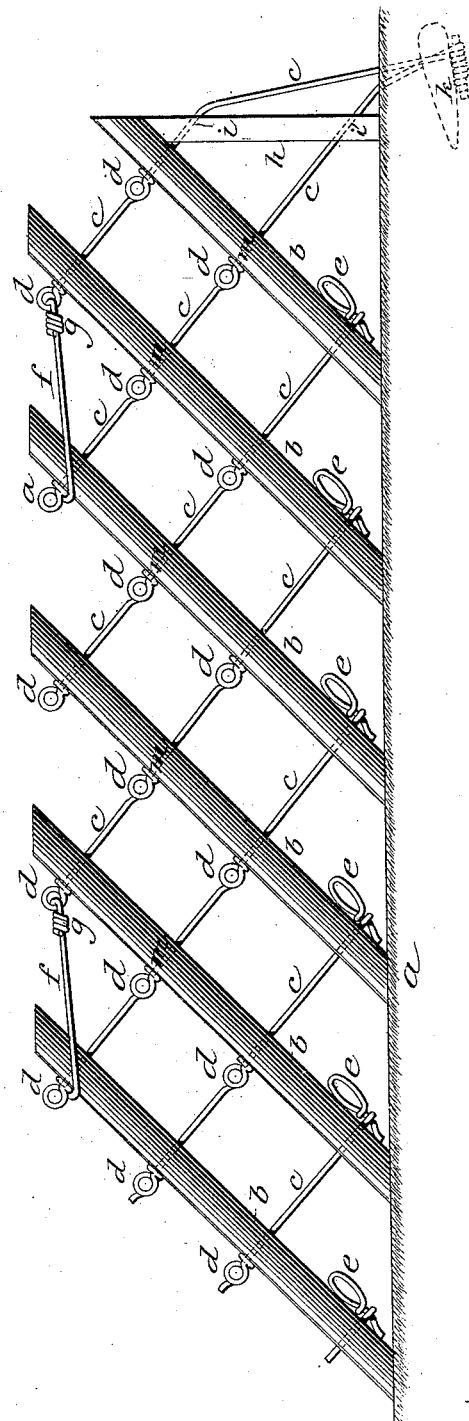
Witnesses:
Geo. O. Jones
E. N. Hill
Inventor:
J. N. Edgerly

UNITED STATES PATENT OFFICE.

JAMES N. EDGERLY, OF CLEVELAND, OHIO.

TRUSS HEDGE FENCE.

SPECIFICATION forming part of Letters Patent No. 347,423, dated August 17, 1886.

Application filed January 2, 1886. Serial No. 187,484. (No model.)

*To all whom it may concern:*

Be it known that I, JAMES N. EDGERLY, a citizen of the United States, residing at the city of Cleveland, in the county of Cuyahoga and state of Ohio, have invented a new and useful Improvement in Truss Hedge-Fencing, of which the following is a specification.

In the drawing the figure represents an elevation of my invention relating to improvements in hedge-fencing.

The hedge is constructed as follows: After the young trees are properly trimmed of all their lateral branches the wire $c$, at the end of the hedge, is anchored in the ground to the anchor $k$, which consists of a block of wood or other suitable material. The first tree is bent down to rest on the upright bar $h$. Said bar and tree are then bored or pierced through their centers and the wire passed through the holes $i$ and $m$, respectively. It is then seized by a pair of round-pointed pliers and passed around one jaw thereof, and then wound once around itself next to the tree in its inclined position. The adjacent trees are then pierced and the wire passed through the holes and loop $d$, formed on the upper side of each tree, until the top of the hedge is reached, when the wire is brought back on a horizontal line and passed through the loop $d$ on the adjoining tree and secured by twisting, as shown at $g$. The cross-bar loop $e$, at the end of the wire, is then formed by grasping said wire near the end and twisting it around one of the jaws of the pliers, and then around upon itself. This cross-bar loop prevents the wire from being drawn through the hole $m$ in the tree. Proceed as before described until the hedge is completed.

I am aware that prior to my invention hedge fences have been made with trees upright and inclined, and with their lateral branches interwoven, and that they have been held in position by wire looped around or stapled to the trees. I therefore do not claim such construction; but What I do claim as my invention, and desire to secure by Letters Patent, is—

A hedge fence composed of live plants bent at an angle to the plane of the fence and held in place by wires, which are passed through holes pierced or bored through the plants, said wires passing through the plants at an angle thereto and looped, substantially as set forth.

JAMES N. EDGERLY.

Witnesses:
JOHN G. RUPLE,
GEO. O. JONES.